W. R. COLLIER.
PISTON HEAD.
APPLICATION FILED AUG. 24, 1917.

1,261,770.

Patented Apr. 9, 1918.

Witnesses

W. R. Collier,
Inventor,
by C. A. Snow & Co.
Attorneys

UNITED STATES PATENT OFFICE.

WILLIAM REID COLLIER, OF AUSTIN, TEXAS.

PISTON-HEAD.

1,261,770.   Specification of Letters Patent.   Patented Apr. 9, 1918.

Application filed August 24, 1917.   Serial No. 188,050.

*To all whom it may concern:*

Be it known that I, WILLIAM R. COLLIER, a citizen of the United States, residing at Austin, in the county of Travis and State of Texas, have invented a new and useful Piston-Head, of which the following is a specification.

This invention relates to piston heads particularly designed for use in connection with a hydrocarbon engine, one of the objects of the invention being to provide a novel form of ball and socket connection between the piston rod and the piston head, said connection being durable in construction, cheap to manufacture, and easily applied, the connection when in position serving to securely hold together the parts and to permit free movement of the rod relative to the piston head.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—

Figure 2:
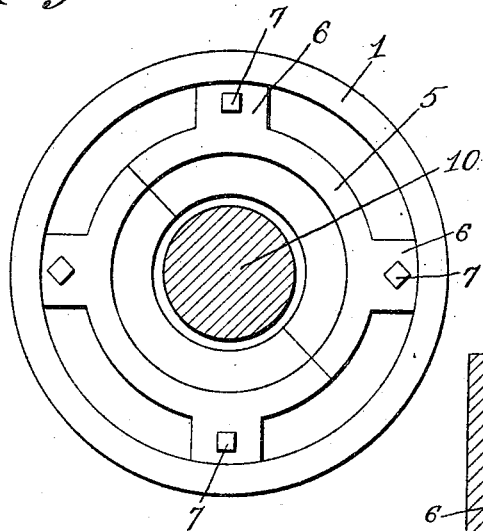
Fig. 2 is a section on line 2—2 Fig. 1.
Figure 1:
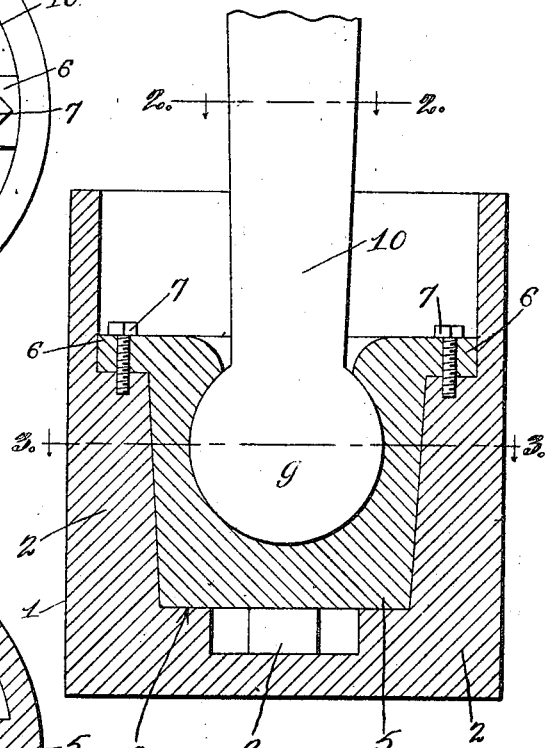
Figure 1 is a central longitudinal section through a piston head embodying the present improvements, the ball end of the piston rod being shown in position therein.
Figure 3:
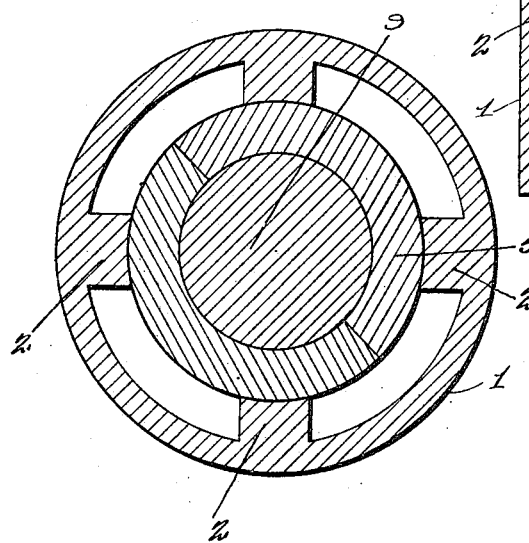
Fig. 3 is a section on line 3—3 Fig. 1.

Referring to the figures by characters of reference 1 designates a piston head, the same being formed hollow and open at one end. Formed within this piston head are radial ribs 2 extending from the closed end of the piston head to a point spaced from the open end of said piston head. The inner ends of the ribs are extended inwardly to provide shoulders or seats 3 while those portions of the inner edges of the ribs between the shoulders 3 and the outer ends of the ribs are inclined as at 4 thus to converge toward the closed end of the piston head.

Detachably seated within the piston head is a frusto-conical socket member 5 made up of opposed similar sections and which member, when inserted into the piston head, will fit snugly upon the shoulders 3 and upon the inclined edges 4 of the ribs 2. The sections of the socket member are provided with spaced ears 6 extending outwardly therefrom and which are adapted to rest upon the outer ends of the ribs 2. These ears are designed to receive the fastening screws 7 which extend into the ribs so as to hold the socket member securely in place.

In assembling the parts the sections of the socket member are placed upon opposite portions of a ball 9 on a piston rod 10 and with their edges together. Said socket member is then inserted into the piston head and the converging edges 4 of the ribs 2 will fit snugly against the socket member so as to bind the opposed sections together. After the socket member has been fitted snugly within the piston head the fastening screws 7 are placed in position and thus hold all of the parts together securely.

By removing the screws 7 the various parts can be readily disconnected as when it is desired to replace any of the parts.

A connection such as described is cheap to manufacture, provides a tight connection between the piston rod and the head, and allows free movement of the rod relative to the head.

What is claimed is:—

1. The combination with a hollow piston head open at one end and closed at its other end, and radial ribs within said head and extending longitudinally thereof, said ribs having their free longitudinal edges converging toward the closed end of the piston head, of a sectional socket member insertible into the head and between the ribs, means for fastening said socket member to the piston head, and a piston rod having a ball end movably engaged by the socket member.

2. The combination with a hollow piston head open at one end and closed at its other end, and longitudinal ribs within the piston heads and having their longitudinal edges converging toward the closed end of the piston head, there being shoulders on said ribs and adjacent the closed end of the head, of a sectional socket member insertible into the head and held together by the ribs, said shoulders constituting abutments for the socket member, a piston rod having a ball end seated within the sectional socket member, and means for securing said socket member to the ribs to hold the socket member in engagement with the ball end.

3. The combination with a hollow piston head open at one end and closed at its other end, and longitudinal ribs within the piston head and converging toward the closed end thereof, of a sectional socket member wedged between the ribs and held together thereby, a piston rod having a ball end projecting into and adapted to work within the socket member, and means for detachably securing the socket member to the ribs.

In testimony that I claim the foregoing as my own, I have hereto affixed my signature in the presence of two witnesses.

WILLIAM REID COLLIER.

Witnesses:
JESSIE KUYKENDALL,
ADDIE McCLELLAN.